United States Patent
Smith et al.

(10) Patent No.: US 9,936,325 B2
(45) Date of Patent: *Apr. 3, 2018

(54) SYSTEMS AND METHODS FOR ADJUSTING AUDIO BASED ON AMBIENT SOUNDS

(71) Applicant: Disney Enterprises, Inc., Burbank, CA (US)

(72) Inventors: Tony Smith, Sherman Oaks, CA (US); Leon Silverman, Encino, CA (US); Alexander C. Chen, La Canada-Flintridge, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/688,583

(22) Filed: Aug. 28, 2017

(65) Prior Publication Data

US 2017/0359668 A1    Dec. 14, 2017

Related U.S. Application Data

(63) Continuation of application No. 14/994,058, filed on Jan. 12, 2016, now Pat. No. 9,781,537.

(51) Int. Cl.
*H04R 29/00* (2006.01)
*H04S 7/00* (2006.01)
*G06F 3/16* (2006.01)

(52) U.S. Cl.
CPC ............. *H04S 7/301* (2013.01); *G06F 3/165* (2013.01); *H04R 29/00* (2013.01); *H04R 2410/05* (2013.01); *H04R 2430/01* (2013.01); *H04S 2400/01* (2013.01); *H04S 2400/13* (2013.01)

(58) Field of Classification Search
CPC .. H04S 7/301; H04S 2400/13; H04S 2400/01; G06F 3/165; H04R 2410/05; H04R 2430/01; H04R 29/00
See application file for complete search history.

(56) References Cited

U.S. PATENT DOCUMENTS 7,706,551 B2 *   4/2010   Falcon ...................... H04S 7/00
                                                             381/104

* cited by examiner

*Primary Examiner* — Muhammad N Edun
(74) *Attorney, Agent, or Firm* — Farjami & Farjami LLP

(57) ABSTRACT

There is provided a system for use in an environment, the system comprising a microphone, a plurality of speakers, a memory storing an executable code, and a processor executing the executable code to receive a media content including an audio component, play the audio component of the media content over at least one of the plurality of speakers, detect, while playing the audio component, an ambient sound in the environment using the microphone, and adjust playing of the audio component of the media content for the at least one of the plurality of speakers based on the ambient sound in the environment.

20 Claims, 4 Drawing Sheets

SYSTEMS AND METHODS FOR ADJUSTING AUDIO BASED ON AMBIENT SOUNDS

This application is a Continuation of U.S. application Ser. No. 14/994,058, filed Jan. 12, 2016, which is hereby incorporated by reference in its entirety.

BACKGROUND

Ambient sounds can significantly affect the audio experience of listeners enjoying a song, a movie or a television program. Additionally, ambient sounds may continuously change while watching a movie or listening to a song. To cope with ambient sounds or background noise and their continuous changes, listeners are frequently forced to manually increase the volume, pause and/or rewind each time there is an ambient sound that interferes with their listening experience.

SUMMARY

The present disclosure is directed to systems and methods for adjusting audio based on ambient sounds, substantially as shown in and/or described in connection with at least one of the figures, as set forth more completely in the claims.

DETAILED DESCRIPTION

Figure 1:
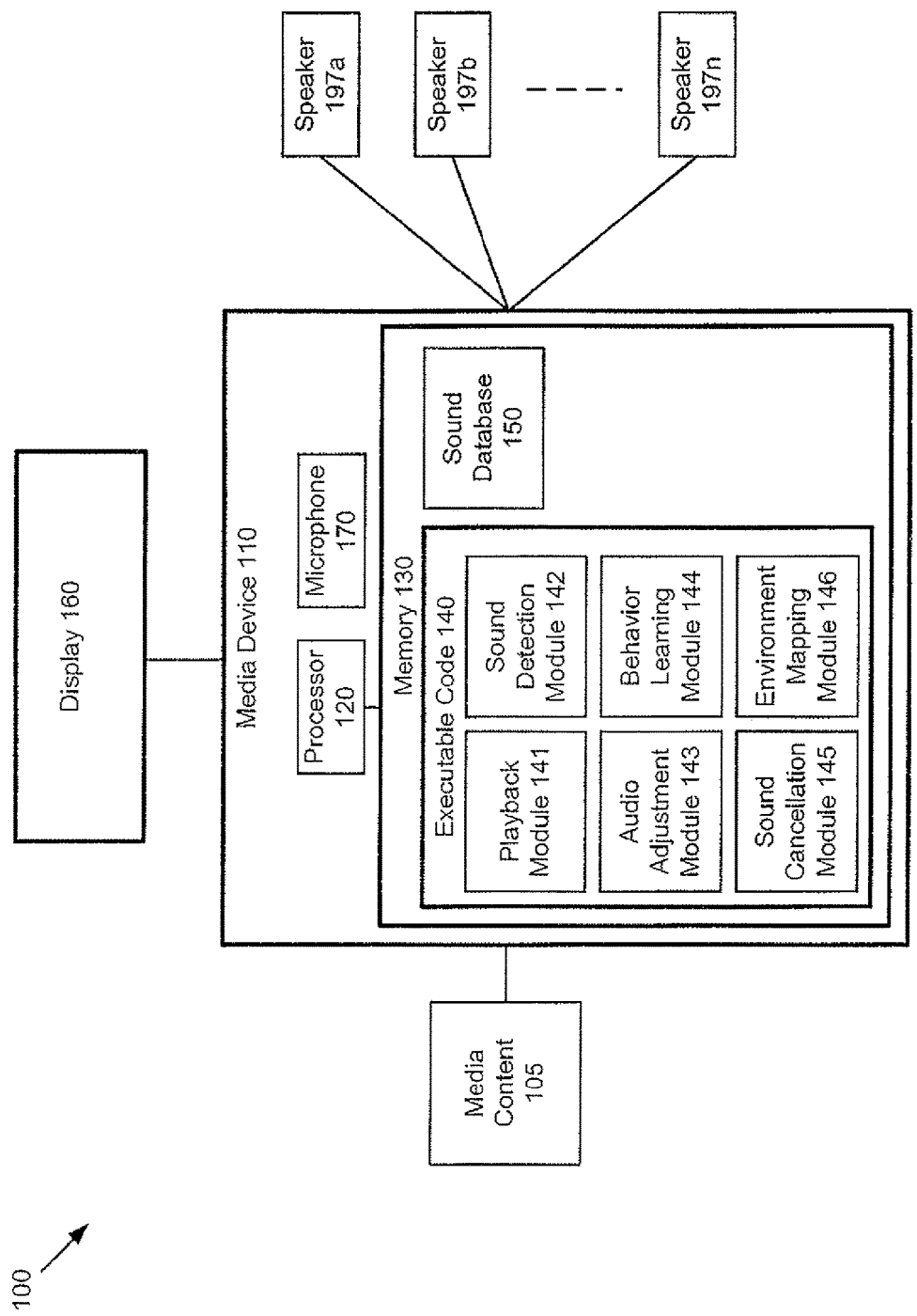
FIG. 1 shows a diagram of an exemplary system for adjusting audio based on ambient sounds, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for adjusting audio based on ambient sounds, according to one implementation of the present disclosure. System 100 includes media content 105, media device 110, display 160, and speakers 197a-197n. Media device 110 includes processor 120, memory 130, and microphone 170. Processor 120 is a hardware processor, such as a central processing unit (CPU) used in computing devices. Memory 130 is a non-transitory storage device for storing computer code for execution by processor 120, and also storing various data and parameters. As shown in FIG. 1, memory 130 includes executable code 140 and sound database 150.

Media content 105 may be an audio content, a video content including an audio component, a multimedia content including an audio component, etc. In some implementations, media content 105 may be stored in memory 130. In other implementations, media device 110 may receive media content 105 from a media playback device or over a computer network, such as the Internet. Media content 105 includes an audio component, such as a stereo audio component, a surround sound audio component, a 3D sound component, an object oriented sound component, etc.

Media device 110 may be any device capable of playing media content, such as a computer, a television, a stereo system, a radio, a CD player, or any other digital audio player, a DVD a home theater receiver, etc. In some implementations, media device 110 may be configured to connect to a plurality of speakers, such as speakers 197a, speaker 197b, . . . , and speaker 197n.

As shown in FIG. 1, memory 130 of media device 110 includes executable code 140. Executable code 140 has one or software modules stored in memory 130 for execution by processor 120 of media device 110. In some implementations, executable code 140 may include playback module 141, sound detection module 142, audio adjustment module 143, behavior learning module 144, sound cancellation module 145, and environment mapping module 146. Additionally, executable code 140 may use other resources, such as sound database 150 stored in memory 130.

Playback module 141 is a software module for execution by processor 120 to play media content 105. In some implementations, playback module 141 may play a video portion of media content 105 on display 160, and an audio component of media content 105 using speakers 197a-197n. Playback module 141 may include an audio player for playing an audio, or a surround sound audio including a plurality of surround sound audio components. The plurality of surround sound audio components may include a center audio component, one or more front audio components, one or more back sound audio components, one or more surround sound audio components, etc. Playback module 141 may also include an audio player for playing a three-dimensional (3D) audio including a plurality of 3D audio components. The plurality of 3D audio components may include a plurality of surround-sound components and one or more elevated and/or overhead speakers. In other implementations, playback module 141 may include an audio player for playing an object-based audio including a plurality of sound tracks, such as a dialog sound track, a music sound track, an effects sound track, etc.

Sound detection module 142 is a software module for execution by processor 120 to detect sound or noise in the environment. To detect a sound or noise in the environment, sound detection module 142 may use microphone 170. In some implementations, sound detection module 142 may detect a duration of the ambient sound or noise in the environment and/or a volume/intensity of the ambient sound or noise in the environment. Sound detection module 142 may detect a different volume/intensity of the ambient sound or noise at different locations in the environment, and may periodically or continuously update the volume/intensity detected at each location in the environment. In some implementations, sound detection module 142 may receive an analog input from microphone 170 and convert the analog input signal to a digitized signal using an analog-to-digital (A/D) converter. Sound detection module 142 may sample the digitized signal and search for a match in sound database 150, and may identify the detected sound when a match is found. After identifying the sound using sound database 150, sound detection module may communicate with audio adjustment module 143 and provide a sound identification (ID) for use by audio adjustment module 143. In some implementations, sound detection module 142 may detect an intensity or volume of a detected sound as well, even if the sound may not be identified using sound database 150. For example, some sounds may be merely background noise or may be sounds that are unique to a particular environment, and may not exist in sound database 150, such as a particular mobile phone ring tone, a background conversation in the environment, a radio playing in the environment, etc.

Audio adjustment module 143 is a software module for execution by processor 120 to adjust the playing of one or more audio components of media content 105. In some implementations, audio adjustment module 143 may increase the volume or intensity of one or more audio components of media content 105, such as a stereo component, a surround sound component, a 3D sound component, an object oriented sound component, etc. The adjustment made may be in response to receiving a sound identification from sound detection module 142, such that audio adjustment module 143 may make adjustments to one or more audio components of media content 105, based on the length and the intensity or volume of the detected sound in the environment.

In one implementation, audio adjustment module 143 may adjust the volume or the audio level of one or more audio components of media content 105 based on a user's preference. In such an implementation, media content 105 may have a range of audio levels defined in decibels (or dB), and audio adjustment module 143 may equalize the audio level based on the user's preference. For example, if a song or a movie has an average range of 63 dB and a peak of 95 dB, which are determined to be over the user's preference, audio adjustment module 143 brings down or equalizes the current audio level to match the user's preference. Also, Audio adjustment module 143 may balance the playback rather than adjust the volume or the audio level, and may soften the volume of commercials to a particular level, such as 110 dB.

Audio adjustment module 143 may adjust a volume of an audio component of media content 105, such as adjusting the volume of all sound tracks of the audio component, adjusting the volume of one or more of audio sound tracks of media content 105, such as a dialog sound track, an effects sound track, a music sound track, etc. In some implementations, audio adjustment module 143 may adjust the volume of the audio component, or one or more sound tracks of the audio component, of media content 105 for one or more of speakers 197a-197n.

Behavior learning module 144 is a software module for execution by processor 120 to track and learn one or more behaviors of a user using media device 110 while playing media content 105. Behavior learning module 144 may track the inputs from the user who is viewing media content 105, and may learn particular patterns and/or behaviors of the user. For example, behavior learning module 144 may track inputs received while playing a sporting event, and may detect a pattern that the volume is turned down each time a sporting event shows commentators speaking, and turned back up when game play resumes in the sporting event. Based on the detected pattern or behavior, behavior learning module 144 may turn down the volume when coverage of a sporting event transitions from game coverage to commentators talking. As another example, behavior learning module 144 may learn that a user mutes the sound during the commercials, or that the user always switches from one sports channel to another during commercial breaks. Behavior learning module 144 may learn such behavior and apply these actions automatically.

In some implementations, behavior learning module 144 may include user profiles for a plurality of users of media device 110, such that the behavior of each user is tracked and stored separately. For example, a first user viewing media content 105 may be identified, such that behavior learning module 144 can apply the behaviors stored in the first user's profile.

Sound cancellation module 145 is a software module for execution by processor 120 to cancel ambient sound or noise in the environment. In some implementations, sound cancellation module 145 may receive a sound identification from sound detection module 142, and perform sound or noise cancellation techniques to reduce or eliminate the ambient sound or noise in the environment. For example, when the environment is near an airport, the sounds of jet airplanes taking off, landing or flying overhead may frequently cause a disturbance in the environment. When sound detection module 142 detects the ambient sound of a jet airplane, sound detection module 142 may identify the sound using sound database 150, and communicate the sound identification to sound cancellation module 145. In response to receiving the sound identification corresponding to the jet airplane, sound cancellation module 145 may use sound cancellation techniques to reduce or eliminate the sound of the jet airplane in the environment. In some implementations, the cancellation sound may be performed using speakers 197a-197n, or the cancellation sound may be performed using dedicated sound cancellation speakers.

Environment mapping module 146 is a software module for execution by processor 120 for creating a map of the environment. The map may include a location of the user and/or other individuals in the environment, a location of objects in the environment, such as relative locations of speakers 197a-197n, and seating for users. The map may also include locations of various structural components in the environment, such as windows, doors, etc. In some implementations, a user may input structural information during a setup phase while installing system 100 in an environment. In other implementations, environment mapping module 146 may obtain a position of a user device in the environment, such as a room or a theater, based on transmission of calibration signals initiated by media device 110. The calibration signals may include audio signals emitted from the plurality of speakers 197a, 197b, . . . , and 197n. In response, the user device, such as a personal mobile phone of the user, may utilize a microphone to detect the calibration signals emitted from the plurality of speakers 197a, 197b, . . . , and 197n, and perform a triangulation technique to determine a position of the user device based on its location relative to each of the plurality of speakers 197a, 197b, . . . , and 197n. In some implementations, environment mapping module 146 may determine a position of the user device using one or more cameras (not shown) in the environment. As such, the position of each user device may be determined relative to each of the plurality of speakers 197a, 197b, and 197n.

Sound database 150 is a database stored in memory 130 for use by processor 120 for identifying ambient sounds in the environment. Sound database 150 may contain a plurality of pre-recorded sounds that can be used to identify various ambient sounds in the environment detected using microphone 170. In some implementations, a user may add new sounds to sound database 150 to train media device 110 on new sounds. For example, a user may record the sound of a mobile phone ring tone into sound database 150, so that media device 110 may recognize each time the user's phone rings.

Display 160 is a display suitable for displaying media content 105, such as a television display, a home theater display, a computer display, a tablet computer, etc. Microphone 170 may be a microphone or an array of microphones used to detect ambient sounds in the environment. In some implementations, the array of microphones may include a microphone co-located with each of one or more of speakers 197a-197n.

As shown in FIG. 1, system 100 also includes a plurality of speakers 197a, 197b, . . . , and 197n. The plurality of speakers 197a, 197b, . . . , and 197n may be surround sound speakers, or other speakers suitable for emitting audio. The plurality of speakers 197a, 197b, . . . , and 197n may be connected to media device 110 using speaker wires, or may be connected to media device 110 using wireless technology. Speakers 197a, 197b, . . . , and 197n may be mobile speakers, which may be repositioned by users. The plurality of speakers may also include a speaker of a mobile device, such as a mobile telephone or tablet computer that is wirelessly connected to media device 110. In some implementations, speakers 197a-197n may be used to create virtual speakers by using the position of speakers 197a-197n, and the interferences between the audio transmitted from each speaker of speakers 197a-197n to create an illusion that a sound is originating from a location, where there is no speaker.

Figure 2:
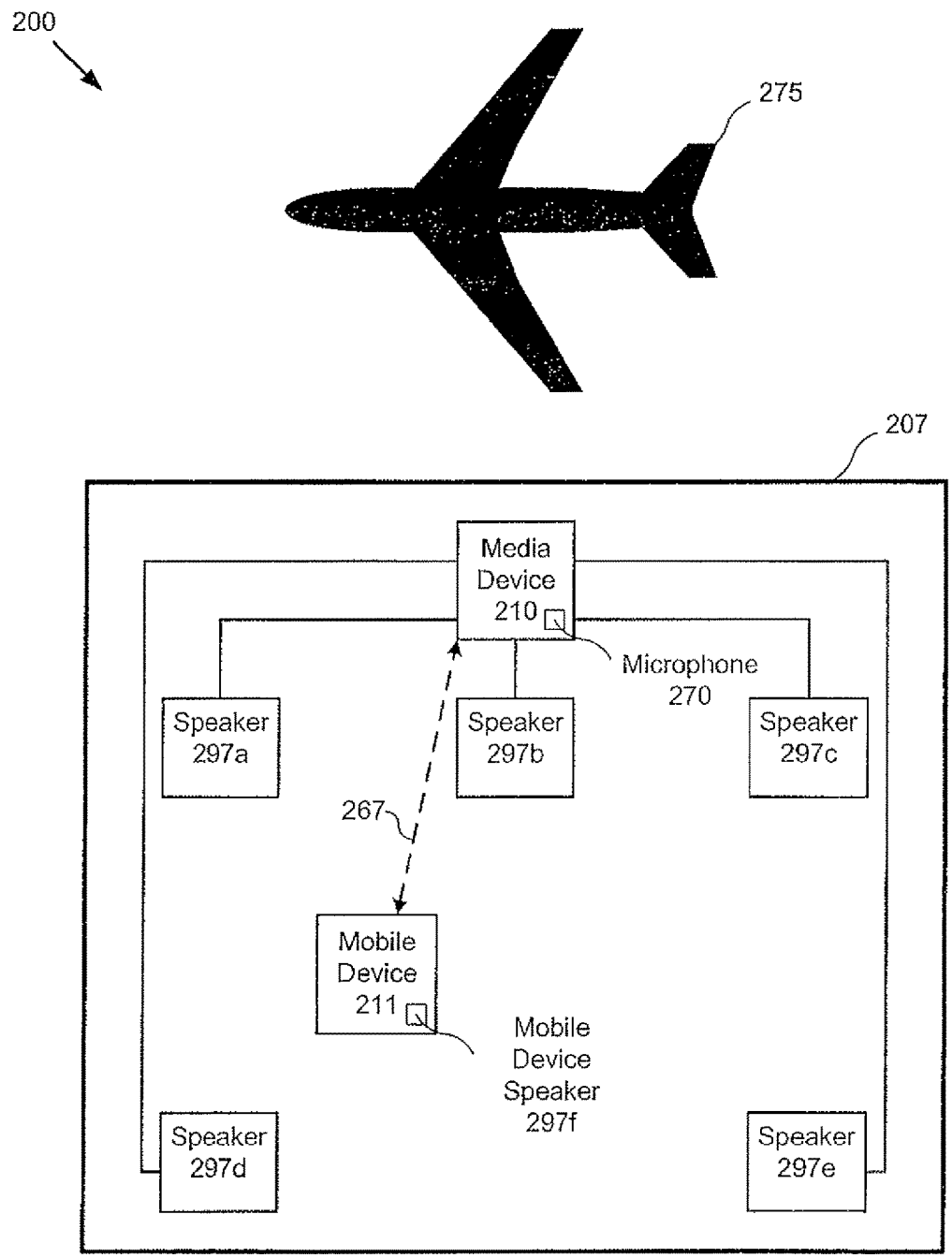
FIG. 2 shows a diagram of an exemplary environment using the system of FIG. 1, according to one implementation of the present disclosure.

FIG. 2 shows a diagram of an exemplary environment using system 100 of FIG. 1, according to one implementation of the present disclosure. Environment 207 may be a room in a house, a theater, a coffee shop, an amphitheater, etc. Environment 207 includes media device 210, a plurality of speakers 297a-297e, and mobile device 211 which includes mobile device speaker 297f, which is wirelessly connected to media device 210 via wireless connection 267. Media device 210 may play media content 105 in environment 207 and concurrently detect ambient sounds in environment 207. For example, microphone 270 may detect the sound of airplane 275 flying nearby. The sound of airplane 275 may disrupt the listening experience of listeners in environment 207, and in response to which, executable code 140 may adjust playing of the audio components of media content 105 to compensate for such disruption, as discussed above in conjunction with FIG. 1. For example, audio adjustment module 143 may increase the volume of a dialog sound track of media content 105, or audio adjustment module 143 may increase the volume of the one or more audio components of media content 105 provided to one or more of speakers 297a-297e. As an example, in response to detecting an ambient sound, executable code 140 may enable mobile device speaker 297f to play the dialog sound track of the audio component of media 105 until the ambient sound of the airplane engine dissipates.

Figure 3:
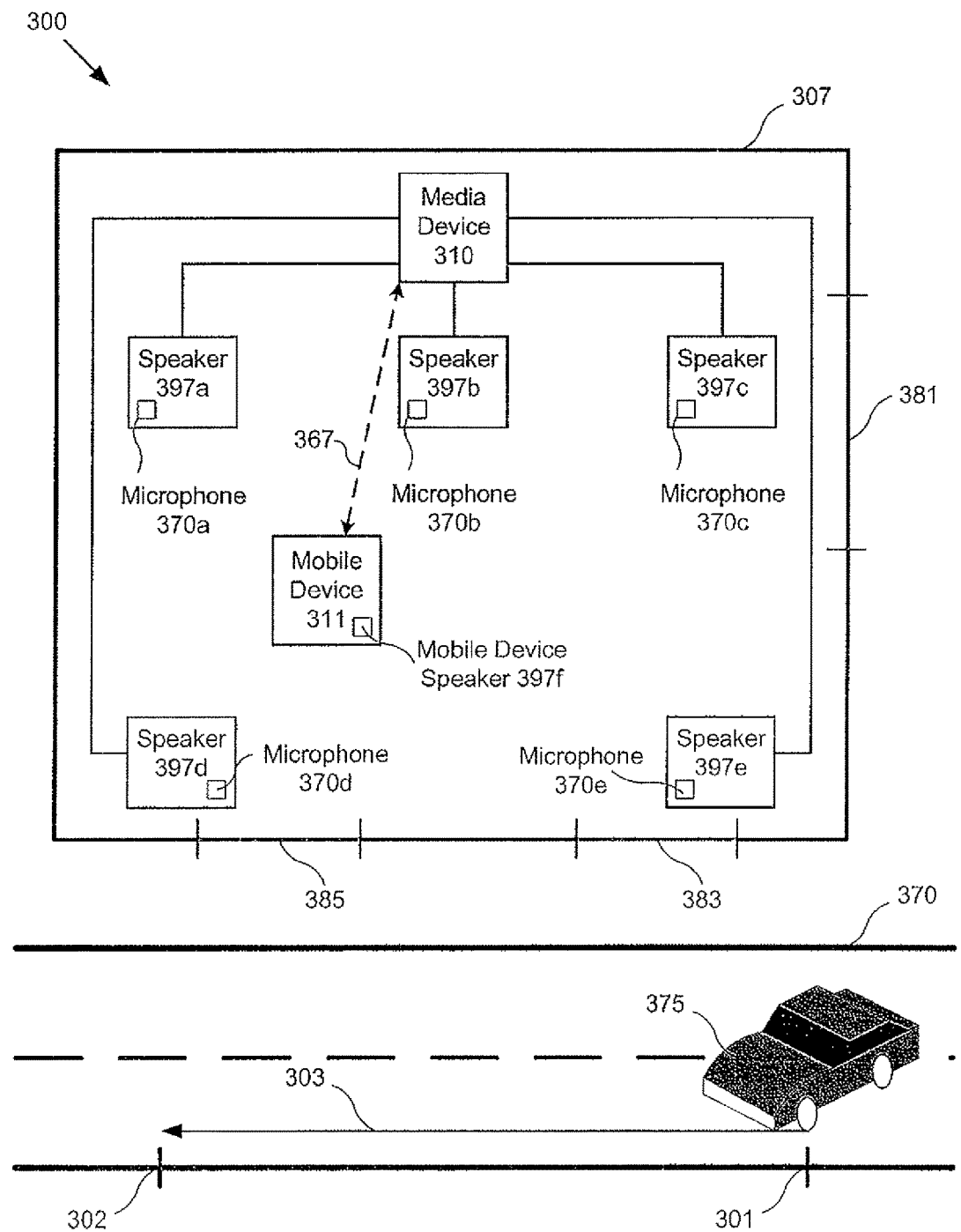
FIG. 3 shows a diagram of another exemplary environment using the system of FIG. 1, according to one implementation of the present disclosure.

FIG. 3 shows a diagram of another exemplary environment using system 100 of FIG. 1, according to one implementation of the present disclosure. Environment 307 corresponds to environment 207 of FIG. 2. Environment 307 includes media device 310, a plurality of microphones 370a-370e, a plurality of speakers 397a-397e, and mobile device 311, which includes mobile device speaker 397f and is wirelessly connected to media device 310 via wireless connection 367. Additionally, environment 307 includes structural components, such as windows 381, 383, and 385. As Media device 310 may play media content 105 in environment 307 and concurrently detect ambient sounds in environment 307. For example, microphones 370a-370e may detect the sound of passing car 375.

Using the array of microphones 370a-370e, media device 310 may determine a direction from which the sound of passing car 375 is entering environment 307 and/or may detect a motion and/or a direction of motion of the source of the ambient sound. For example, as passing car 375 approaches environment 307 and moving in the direction arrow 303, the sound generated by passing car 375 may enter environment 307 through window 381, causing microphone 370c to detect the sound generated by passing car 375 as having a greater intensity than the sound detected by microphones 370a, 370b, 370d, and 370e. As a result of the higher intensity of the sound by passing car 375 detected by microphone 370c, media device 310, using executable code 140, may increase the volume of one or more audio components of media content 105 in speakers 397c and 397e. As passing car 375 proceeds in the direction of arrow 303, the intensity of the sound generated by passing car 375 through window 381 decreases and increases through windows 383 and 385. In response, media device 310 may increase the volume of one or more audio components of media content 105 in speakers 397e and 397d, respectively, as passing car 375 proceeds in the direction of arrow 303. In some implementations, media device 310 may also adjust one or more audio components of media content 105 that is played using mobile device speaker 311.

Figure 4:
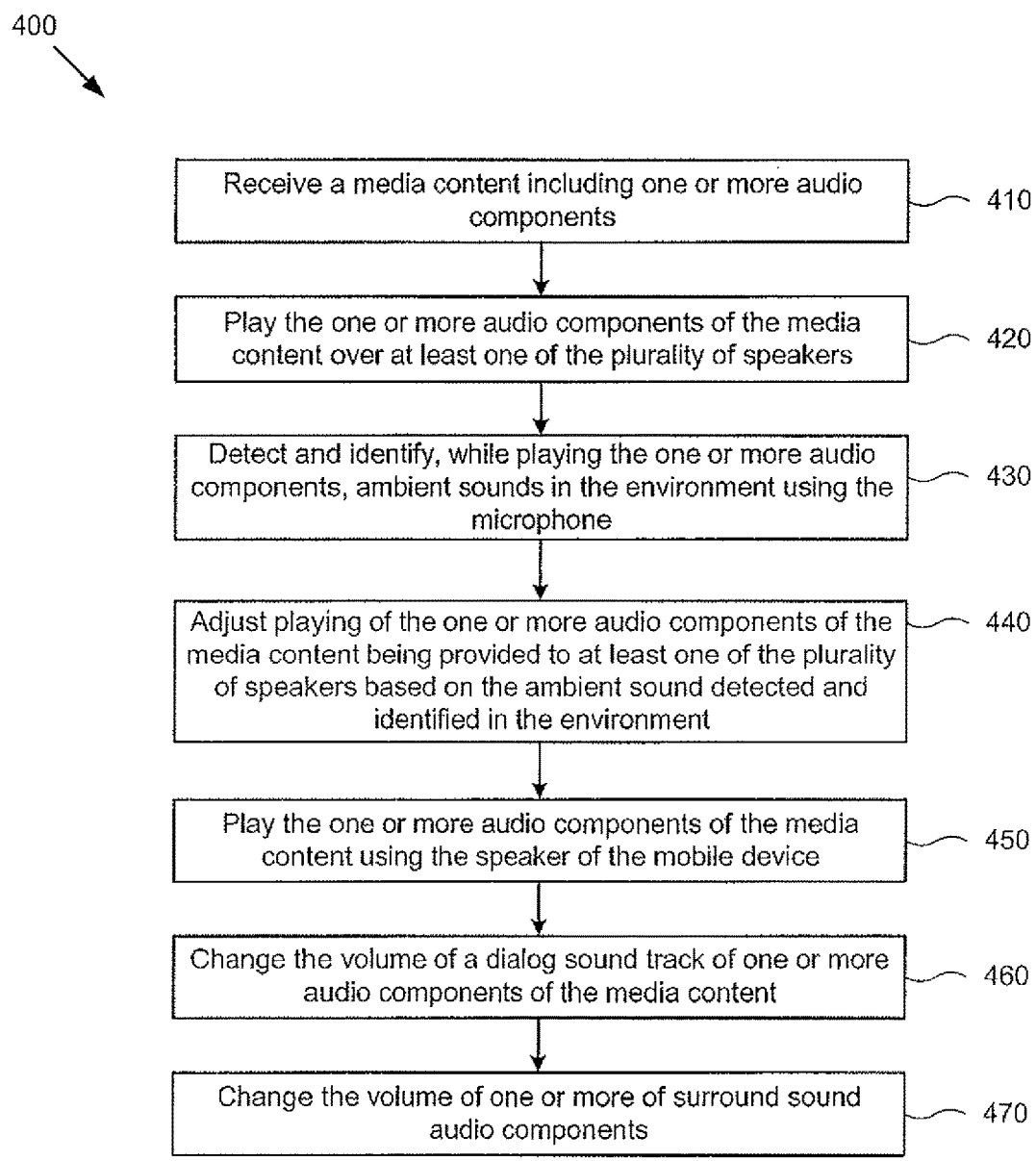
FIG. 4 shows a flowchart illustrating an exemplary method of adjusting audio based on ambient sounds in an environment, according to one implementation of the present disclosure.

FIG. 4 shows a flowchart illustrating an exemplary method of adjusting audio based on ambient sounds in an environment, according to one implementation of the present disclosure. As shown, method 400 begins at 410, where executable code 140 receives media content 105 including one or more audio components. In some implementations, executable code 140 may receive media content 105 from a media server, such as a subscription or ad-supported streaming media service, such as Netflix®, Amazon®, Pandora®, Spotify, etc., or executable code 140 may retrieve media content 105 from memory 130. Media content 105 may be an audio media content, an audio/video media content including one or more audio components, such as a movie or a television show. At 420, executable code 140, using playback module 141, plays one or more audio components of the media content over at least one of the plurality of speakers 197a-197n, which may include a speaker of a mobile device, such as mobile device speaker 297f.

At 430, executable code 140 detects, while playing the one or more audio components, ambient sounds in the environment using microphone 170. The ambient sounds may be a sound that originates within the environment, such as a microwave oven, or a conversation in a coffee shop or movie theater, or the ambient sounds may originate from outside, such as engine noise from an airplane, street noise, the sound of a siren, etc. In some implementations, executable code 140 may detect the intensity or volume of the ambient sounds in the environment using an array of microphones, such as microphones 370a-370e. Using microphones 370a-370e, sound detection module 142 may detect a volume or intensity of the ambient sounds at the location of each of microphones 370a-370e.

Microphone 170 may detect ambient sounds generated within the environment or coming from the outside. In some implementations, microphone 170 may detect the ambient sounds and identify each ambient sound using sound database 150 by converting the incoming analog sound captured by microphone 170 into a digital signal using an A/D converter, and sampling the digital signal to match to a sound in sound database 150. Using the A/D converter, analog audio signals corresponding to ambient sounds may be converted into digital signals to allow sound detection module 142 to detect and identify sounds. This is typically accomplished by pre-processing the ambient sounds, extracting features from the pre-processed ambient sounds, and performing computation and scoring to match extracted features of the pre-processed digitized ambient sounds with pre-recoded sounds in sound database 150.

At 440, executable code 140 adjusts playing of one or more audio components of media content 105 being provided to at least one of speakers 197a-197n based on the detected and identified ambient sound in the environment. In response to detecting and identifying an ambient sound in the environment, audio adjustment module 143 may increase or decrease the volume of one or more audio components (dialog, music, effects) of media content 105 being broadcast by speakers 197a-197n.

In some implementations, audio adjustment module 143 may pause the playing of the audio component of media content 105 via one or more of speakers 197a-197n. For example, when sound detection module 142 detects a sufficiently loud ambient sound, such as an airplane flying overhead or a siren passing, audio adjustment module 143 may determine that pausing the playback of media content 105 may be more desirable than increasing the volume of one or of the audio components of media content 105. In some implementations, audio adjustment module 143 may pause playing media content 105 and subsequently resume playing media content 105 when the ambient sound in the environment has reduced to a suitable level.

In some implementations, audio adjustment module 143 may adjust one or more audio component of media content 105 based on a location or a direction of the source of the sound, and/or a location of a user in the environment. For example, the source of an ambient sound in the environment may be moving, such as a tire engine with the siren passing a house. As the fire engine passes the house, the volume of the audio component of media content 105 may need to be increased in one or more different speakers of speakers 197a-197n to provide an optimum audio experience for a user in the environment.

At 450, executable code 140 plays one or more audio components of the media content using the speaker of a mobile device. In some implementations, media device 110 may wirelessly connect with a mobile device having a speaker, such as a mobile phone or a tablet computer. There may be a process to connect one or more mobile devices with the media device 110, such as pairing devices using Bluetooth or WiFi, or downloading an app onto a mobile device. The speaker of the mobile device may be one of plurality of speakers 197a-197n, and may be used to play one or more audio components of media content 105. For example, the speaker of the mobile device may be used as a speaker to continuously play one or more audio components of media content 105 during the playing of media content 105. As another example, the speaker of the mobile device may be used intermittently or only when the ambient sound in the environment reaches a predetermined high level in the room or near a certain mobile device user, that audio adjustment module 143 increases the volume of one or more audio components of media content 105 played on one or more mobile devices. As another example, the speaker of the mobile device may be used to play only one audio component (such as a dialog sound track) of media content 105, or a surround sound component of media content 105, etc.

At 460, executable code 140 changes the volume of a dialog sound track of one or more audio components of the media content. In some implementations, media content 105 may include an object oriented audio component that may include a dialog sound track, a music sound track, an effects sound track, etc. Playback module 141 may be an object oriented sound playback module, and play a plurality of object oriented sound tracks, such as a dialog sound track, using speakers 197a-197n.

At 470, executable code 140 changes the volume of one or more of a plurality of surround sound audio components. Playback module 141 may be a surround sound playback module, and play a plurality of surround sound audio components to the corresponding surround sound speakers of speakers 197a-197n, such as a center audio component, one or more front audio components, one or more back sound audio components, one or more surround sound audio components.

From the above description, it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system for use in an environment, the system comprising:
 a microphone;
 a plurality of speakers;
 a non-transitory memory storing an executable code; and
 a hardware processor executing the executable code to:
  receive a media content including an audio component;
  play the audio component of the media content over at least one of the plurality of speakers;
  detect, while playing the audio component, an ambient noise in the environment using the microphone; and
  adjust playing of the audio component of the media content for the at least one of the plurality of speakers based on the ambient noise in the environment.

2. The system of claim 1, wherein the hardware processor executes the executable code to further identify the ambient noise using a sound database stored in the non-transitory memory, and wherein detecting includes determining a volume of the ambient noise.

3. The system of claim 1, wherein detecting includes determining a volume of the ambient noise, and wherein adjusting is in response to detecting the ambient noise and based on the volume of the ambient noise.

4. The system of claim 1, wherein the audio content includes a plurality of sound tracks including a dialog sound track, and wherein adjusting the playing of the audio component of the media content includes changing a volume of the dialog sound track but not a volume of all of the plurality of sound tracks.

5. The system of claim 1, wherein the plurality of speakers includes a speaker of a mobile device.

6. The system of claim 5, wherein adjusting the playing of the audio component of the media content includes start playing the audio component of the media content using the speaker of the mobile device, in response to the detecting of the ambient noise in the environment.

7. The system of claim 1, wherein adjusting the playing of the audio component includes pausing the playing of the media content on one or more the plurality of speakers.

8. The system of claim 1, wherein the ambient noise does not include speech.

9. The system of claim 1, wherein the sound databases includes at least one of an engine noise, street noise and sirens.

10. The system of claim 1, wherein the media content includes metadata describing the audio component, and wherein adjusting the playing of the audio component uses the metadata.

11. A method for use with a system having a non-transitory memory and a hardware processor in an environment, the method comprising:
   receiving, using the hardware processor, a media content including an audio component;
   playing, using the hardware processor, the audio component of the media content over at least one of a plurality of speakers;
   detecting, using the hardware processor while playing the audio component, an ambient noise in the environment using a microphone; and
   adjusting, using the hardware processor, playing of the audio component of the media content for the at least one of the plurality of speakers based on the ambient noise in the environment.

12. The method of claim 11, further comprising:
   identify, using the hardware processor, the ambient noise using a sound database stored in the non-transitory memory, and wherein detecting includes determining a volume of the ambient noise.

13. The method of claim 11, wherein detecting includes determining a volume of the ambient noise, and wherein adjusting is in response to detecting the ambient noise and based on the volume of the ambient noise.

14. The method of claim 11, wherein the audio content includes a plurality of sound tracks including a dialog sound track, and wherein adjusting the playing of the audio component of the media content includes changing a volume of the dialog sound track but not a volume of all of the plurality of sound tracks.

15. The method of claim 11, wherein the plurality of speakers includes a speaker of a mobile device.

16. The method of claim 15, wherein adjusting the playing of the audio component of the media content includes start playing the audio component of the media content using the speaker of the mobile device, in response to the detecting of the ambient noise in the environment.

17. The method of claim 11, wherein adjusting the playing of the audio component includes pausing the playing on one or more the plurality of speakers.

18. The method of claim 11, wherein the ambient noise does not include speech.

19. The method of claim 11, wherein the sound databases includes at least one of an engine noise, street noise and sirens.

20. The method of claim 11, wherein the media content includes metadata describing the audio component, and wherein adjusting the playing of the audio component uses the metadata.

* * * * *